US006941453B2

(12) United States Patent
Rao

(10) Patent No.: US 6,941,453 B2
(45) Date of Patent: Sep. 6, 2005

(54) SYSTEM AND METHOD FOR DETERMINING IF A DEVICE NEEDS TO BE UPDATED AND LOCATING AND INVOKING AN UPDATE AGENT TO UPDATE THE FIRMWARE OR SOFTWARE IN THE DEVICE

(75) Inventor: Bindu Rama Rao, Laguna Niguel, CA (US)

(73) Assignee: Bitfone Corporation, Laguna Niguel, CA (US)

( * ) Notice: Subject to any disclaimer, the term of this patent is extended or adjusted under 35 U.S.C. 154(b) by 0 days.

(21) Appl. No.: 10/765,817

(22) Filed: Jan. 27, 2004

(65) Prior Publication Data

US 2004/0210752 A1 Oct. 21, 2004

Related U.S. Application Data

(60) Provisional application No. 60/446,494, filed on Feb. 11, 2003.

(51) Int. Cl.[7] .............................. G06F 9/00; G06F 9/44; G06F 15/177
(52) U.S. Cl. ................. 713/2; 713/1; 717/168
(58) Field of Search ............................ 717/168; 713/1, 713/2

(56) References Cited

U.S. PATENT DOCUMENTS

| | | | | |
|---|---|---|---|---|
| 5,586,304 A | * | 12/1996 | Stupek et al. ................ | 717/170 |
| 6,029,196 A | * | 2/2000 | Lenz ........................... | 709/221 |
| 6,202,207 B1 | * | 3/2001 | Donohue ..................... | 717/173 |
| 6,487,723 B1 | * | 11/2002 | MacInnis ..................... | 725/132 |
| 6,502,193 B1 | * | 12/2002 | Barber ........................ | 713/201 |
| 6,553,490 B1 | * | 4/2003 | Kottapurath et al. .......... | 713/2 |
| 6,704,864 B1 | * | 3/2004 | Philyaw ........................ | 713/1 |
| 6,754,722 B2 | * | 6/2004 | Herzi ........................... | 710/8 |
| 6,760,908 B2 | * | 7/2004 | Ren ............................. | 717/173 |
| 2002/0166001 A1 | * | 11/2002 | Cheng et al. .................. | 710/1 |
| 2002/0184619 A1 | * | 12/2002 | Meyerson ..................... | 717/173 |
| 2004/0158817 A1 | | 8/2004 | Okachi et al. | |
| 2004/0203655 A1 | | 10/2004 | Sinnarajah et al. | |
| 2004/0205709 A1 | | 10/2004 | Hilgen et al. | |
| 2004/0218034 A1 | | 11/2004 | Wang et al. | |
| 2004/0230963 A1 | | 11/2004 | Rothman et al. | |
| 2004/0237079 A1 | | 11/2004 | Cox et al. | |

OTHER PUBLICATIONS

The Mac Observer, Update Agent Scouts Out An Update For Itself, May 9, 2000, pp. 1–3.*
Engstrom Don, Two Clicks to a Rejuvenated Mac: A Review of UpdateAgent—CD Edition, Feb. 20, 2002, pp. 1–3.*
Starlin Mark, UpdateAgent 8, Nov. 19, 2002, pp. 1–2.*

* cited by examiner

*Primary Examiner*—Thomas Lee
*Assistant Examiner*—Mark Connolly
(74) *Attorney, Agent, or Firm*—McAndrews, Held & Malloy

(57) ABSTRACT

Disclosed herein is a method for updating at least one of firmware, software, device components, and device configuration in an electronic device. The method and apparatus may employ at least one update agent or a plurality of update agents. An electronic device supporting multiple update agents may be adapted to prompt and facilitate an end-user to select at least one of the update agents to process update information contained in at least one update. The electronic device may also be adapted to prompt and facilitate an end-user to apply a particular update agent to update at least one of firmware, software, device components, device configuration, device information, and device parameters. The electronic device may also be adapted to prompt and facilitate an end-user to select an appropriate update agent from a plurality of available update agents based upon some information, such as for example, the type of update that the update agent is adapted to perform.

67 Claims, 4 Drawing Sheets

SYSTEM AND METHOD FOR DETERMINING IF A DEVICE NEEDS TO BE UPDATED AND LOCATING AND INVOKING AN UPDATE AGENT TO UPDATE THE FIRMWARE OR SOFTWARE IN THE DEVICE

CROSS-REFERENCE TO OTHER APPLICATIONS

The present application claims the benefit of priority of U.S. Provisional Patent Application having Ser. No. 60/446,494, filed on Feb. 11, 2003, and hereby incorporates herein by reference the complete subject matter thereof in its entirety.

The present application also hereby incorporates herein by reference the complete subject matter of PCT Application having publication number WO 02/41147 A1, and having application No. PCT/US01/44034, filed on Nov. 19, 2001, in its entirety.

The present application also hereby incorporates herein by reference the complete subject matter of U.S. Provisional Patent Application having Ser. No. 60/249,606, filed Nov. 17, 2000 in its entirety.

FEDERALLY SPONSORED RESEARCH OR DEVELOPMENT

Not Applicable

MICROFICHE/COPYRIGHT REFERENCE

Not Applicable

BACKGROUND OF THE INVENTION

Electronic devices (i.e., mobile electronic devices having software/firmware), for example, mobile cellular phones, personal digital assistants (PDA's), pagers, MP3 players, digital cameras, etc. often contain firmware and/or application software that are either provided by the manufacturers of the electronic devices, telecommunication carriers, or third parties. These firmware and application software often contain bugs. New versions (updates) of the firmware and software are periodically released to fix the bugs, introduce new features, or both.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a method of updating at least one of firmware and software in an electronic device comprising a plurality of update agents. The method may comprise displaying a list of available update agents to an end-user. The update agents may be associated with at least one update. The method may also comprise prompting the end-user to select an update agent, invoking the selected update agent based upon information corresponding to a particular update, and performing the particular update.

In an embodiment according to the present invention, the method may further comprise rebooting the electronic device after update completion.

In an embodiment according to the present invention, the method may further comprise one of resuming and commencing characteristic electronic device operation after update completion.

In an embodiment according to the present invention, the method may further comprise detecting a need to update at least one of firmware, software, device components, and device configuration during one of power-up and reboot.

In an embodiment according to the present invention, the method may further comprise displaying a list of available updates. The plurality of update agents may each be adapted to process particular updates. Prompting an end-user to select a particular update agent may correspond to prompting an end-user to apply a particular update.

In an embodiment according to the present invention, the method may further comprise executing an update application loader, invoking a boot initialization code, determining a list of available update agents and corresponding updates, and determining whether the electronic device needs to be updated by evaluating the list of available update agents and corresponding updates.

In an embodiment according to the present invention, the method may further comprise determining an update agent to invoke from among a plurality of available update agents based upon at least one of an update type, a name of an update, and a sub-component of a name of an update, to update at least one of firmware, software, device components, and device configuration of the electronic device.

In an embodiment according to the present invention, the method may further comprise maintaining a table of update agents in the electronic device. The table of update agents maps update types to corresponding update agents. The method may also comprise employing the table of update agents to determine an update agent adapted to process a particular update, and employing the determined update agent to process the particular update.

In an embodiment according to the present invention, the method may further comprise conducting a security check to determine whether a selected update agent is permitted to update sections of non-volatile memory associated with a particular update.

In an embodiment according to the present invention, the method may further comprise selecting at least one update agent adapted to process a plurality of available updates, and applying the available updates using the selected at least one update agent.

In an embodiment according to the present invention, the method may further comprise maintaining an update agent table. The update agent table may comprise at least one of names of a plurality of update agents available in the electronic device, references to the plurality of update agents, and references to locations of the plurality of update agents.

In an embodiment according to the present invention, the method may further comprise determining an update agent to perform an update, obtaining a reference to the update agent by evaluating an update agent table, and performing at least one update associated with the update agent.

In an embodiment according to the present invention, the method may further comprise maintaining a table of update agents. The table of update agents may comprise entries providing information corresponding to update agents and associated updates available in the electronic device.

In an embodiment according to the present invention, the method may further comprise maintaining an update agent table comprising references to a plurality of update agents in the electronic device. The update agent table may map at least one of update agent names, update agent address locations, type information corresponding to updates that particular update agents are adapted to process, and availability of particular update agents.

In an embodiment according to the present invention, type information may further comprise at least one of a file extension corresponding to a particular update that an update agent is adapted to process and a list of file extensions corresponding to a plurality of updates that an update agent is adapted to process.

In an embodiment according to the present invention, the electronic device may comprise one of a mobile cellular phone handset, a personal digital assistant, a pager, an MP3 player, and a digital camera.

Aspects of the present invention may be found in an electronic device comprising a plurality of update agents in non-volatile memory. Each of the update agents may be adapted to update at least one of firmware, software, device configuration, and device components. The electronic device may also comprise random access memory, and an update application loader.

In an embodiment according to the present invention, the electronic device may be adapted to display a list of available update agents from the plurality of update agents in non-volatile memory in the electronic device to an end-user, prompt the end-user to select an update agent, invoke the selected update agent based upon information corresponding to a particular update, and performing the particular update.

In an embodiment according to the present invention, the electronic device may be adapted to reboot after update completion.

In an embodiment according to the present invention, the electronic device may be adapted to one of resume and commence characteristic electronic device operation after update completion.

In an embodiment according to the present invention, the electronic device may be adapted to detect a need to update at least one of firmware, software, device configuration, and device components during one of power-up and reboot.

In an embodiment according to the present invention, the electronic device may be adapted to display a list of available updates. Each of the plurality of update agents may be adapted to process a particular update. An end-user may be prompted to select a particular update agent. Selecting a particular update agent may correspond to selecting a particular update.

In an embodiment according to the present invention, the electronic device may be adapted to execute an update application loader during one of power-up and reboot, invoke a boot initialization code, determine a list of available update agents and corresponding updates, and determine whether the electronic device needs to be updated by evaluating the list of available update agents and corresponding updates.

In an embodiment according to the present invention, the electronic device may be adapted to determine an update agent to invoke from among a plurality of available update agents based upon at least one of an update type, a name of an update, and a sub-component of a name of an update, to update at least one of firmware, software, device components, and device configuration of the electronic device.

In an embodiment according to the present invention, the electronic device may be adapted to maintain a table of update agents in the electronic device. The table of update agents may map update types to corresponding update agents. The electronic device may also be adapted to employ the table of update agents to determine an update agent adapted to process a particular update and to employ the determined update agent to process the particular update.

In an embodiment according to the present invention, the electronic device may be adapted to conduct a security check to determine whether a selected update agent is permitted to update sections of non-volatile memory associated with a particular update.

In an embodiment according to the present invention, the electronic device may be adapted to determine an update agent adapted to process a plurality of available updates and apply the available updates.

In an embodiment according to the present invention, the electronic device may be adapted to maintain an update agent table. The update agent table may comprise at least one of names of a plurality of update agents available in the electronic device, references to the plurality of update agents, and references to locations of the plurality of update agents.

In an embodiment according to the present invention, the electronic device may be adapted to determine an update agent to perform an update, obtain a reference to the update agent by evaluating an update agent table, invoke the update agent, and perform at least one update associated with the update agent.

In an embodiment according to the present invention, the electronic device may be adapted to maintain a table of update agents. The table of update agents may comprise entries providing information corresponding to update agents and associated updates available in the electronic device.

In an embodiment according to the present invention, the electronic device may be adapted to maintain an update agent table comprising references to a plurality of update agents in the electronic device. The update agent table may map at least one of update agent names, update agent address locations, type information corresponding to updates that particular update agents are adapted to process, and availability of particular update agents.

In an embodiment according to the present invention, type information may further comprise at least one of a file extension corresponding to a particular update that an update agent is adapted to process and a list of file extensions corresponding to a plurality of updates that an update agent is adapted to process.

In an embodiment according to the present invention, the electronic device may comprise one of a mobile cellular phone handset, a personal digital assistant, a pager, an MP3 player, and a digital camera.

Aspects of the present invention may be found in a mobile electronic device comprising an update application loader and a boot initialization code. The update application loader may be adapted to be executed at one of startup and reboot. The update application loader may also be adapted to invoke the boot initialization code, determine whether the mobile electronic device needs to be updated, locate an update agent, and invoke the located update agent to update at least one of firmware and software in the mobile electronic device.

In an embodiment according to the present invention, the located update agent may be an application. The update application loader may invoke the located update agent after determining that at least one of firmware and software needs to be updated.

In an embodiment according to the present invention, the update application loader may be adapted to invoke a located update agent and be updated by the located update agent.

In an embodiment according to the present invention, performing an update may comprise installing a second update agent. The mobile electronic device may be adapted to invoke a first update agent to perform the update installing the second update agent in the mobile electronic device.

In an embodiment according to the present invention, the update application loader may be adapted to be updated to a new version by invoking an update agent to update the update application loader.

Aspects of the present invention may be found in a mobile electronic device comprising a boot initialization code and an update application loader. The mobile electronic device, during at least one of reboot and power up, may be adapted to execute the boot initialization code. The update application loader may also be adapted to determine whether the mobile electronic device needs to be updated. The update application loader may be adapted to employ at least one of a plurality of update agents, each of the update agents comprising at least one associated update. The update application loader may also be adapted to determine an update agent to perform the at least one associated update and select the update agent from among the plurality of available update agents.

In an embodiment according to the present invention, the update application loader may be adapted to select at least one of the plurality of available update agents based upon at least one of a type of update the update agent is adapted to perform and a particular characteristic associated with a particular update.

These and various other advantages and features of novelty which characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION OF THE DRAWINGS

Figure 1:
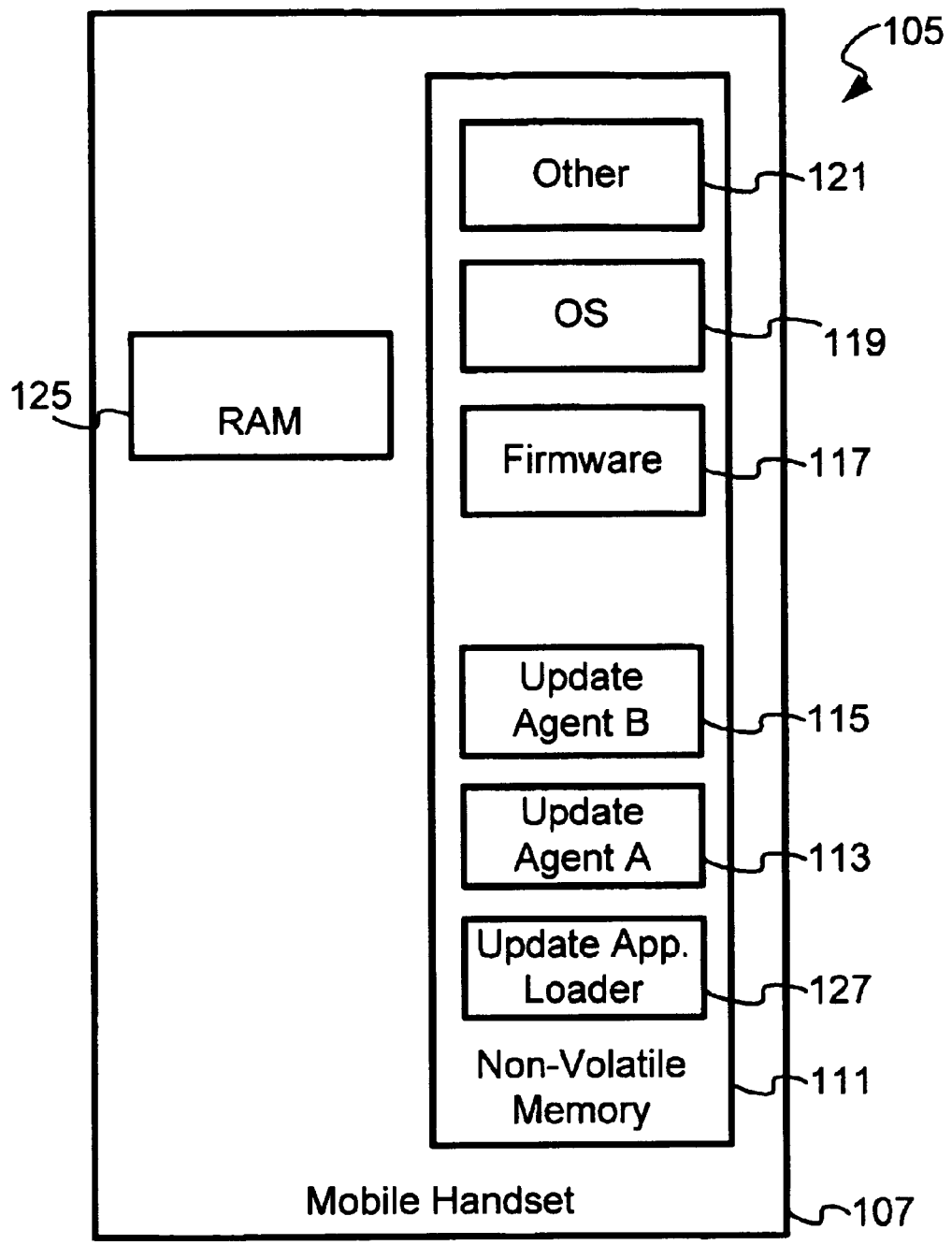
FIG. 1 is a block diagram illustrating an electronic device capable of employing at least one of several available update agents to update at least one of software and firmware according to an embodiment of the present invention.

FIG. 1 is a block diagram 105 illustrating an electronic device capable of employing at least one of several available update agents to update at least one of software and firmware according to an embodiment of the present invention. An electronic device may be for example, a mobile electronic device having software/firmware, such as, mobile cellular phone handsets, personal digital assistants (PDA's), pagers, MP3 players, digital cameras, etc.

An electronic device, for example mobile handset 107, may be capable of employing one of several available update agents to update at least one of software and firmware in the mobile handset 107. An update agent may be a device or software application that is capable of updating firmware, an operating system, or other application software, etc. An update agent may also be adapted to interact with one or more memory devices. The electronic device may comprise random access memory (RAM) 125 and non-volatile memory 111. The non-volatile memory 111 may comprise a plurality of software components, such as for example, update application loader 127, update agent A 113, update agent B 115, firmware 117, operating system (OS) software 119, and other components 121.

The electronic device may be capable of employing an update agent to update firmware 117, OS software 119, or other components 121. The electronic device may employ more than one update agent, if necessary. The electronic device may be capable of displaying a list of available update agents to an end-user to solicit or prompt the end-user to select a specific update. An update may comprise firmware/software updates that modify or change the version of a particular firmware/software, for example, upgrading to a newer version. An update may also add new services to the electronic device or delete services, as desired by the service provider or an end-user. The electronic device may be capable of invoking an appropriate update agent based upon the update content or characteristics. The electronic device may also be capable of rebooting the electronic device, after update completion, as necessary.

In an embodiment according to the present invention, the electronic device may detect the need to update at least one of firmware and software during power up or reboot. The electronic device may also display a list of available update agents to the end-user. Each of the update agents may correspond to a list of available updates or a single update. The electronic device may prompt the end-user to select at least one of the update agents/updates for update processing.

During power-up or reboot, the electronic device may execute update application loader 127. Update application loader 127 may invoke boot initialization code before determining whether the electronic device needs to be updated. The update application loader 127 may also determine a list of available update agents in the electronic device for performing a particular update. For the exemplary mobile handset 107 of FIG. 1, the list of update agents may contain at least a reference to, for example, update agent A 113 and update agent B 115, and may be displayed to the end-user. The end-user may select at least one of the update agents displayed. The selected update agent may be employed to update at least one of firmware, software, and device components or configuration in the electronic device. The update application loader 127 may also invoke the selected update agent, such as for example, update agent A 113, and transfer control to the selected update agent.

In an embodiment according to the present invention, during power-up or reboot, the electronic device may execute the update application loader 127 after invoking the boot initialization code. The update application loader 127 may determine the appropriate update agent to invoke from among a plurality of available update agents, such as, for example, update agent A 113 and update agent B 115, based upon the type of update selected or displayed for selection, or based upon the particular characteristics of the update selected or displayed for selection. The name of the update, or a sub-component of the name of the update, may provide sufficient information and be used by update application loader 127 to determine at least one of a plurality of available update agents which may be invoked to update at least one of firmware, software, and configuration, etc. of the electronic device.

In an embodiment according to the present invention, update agent A 113 for example, may be employed to update firmware 117 and operating system 119. The device may be rebooted, after update completion. Update agent B 115, for example, may be used to update other components 121, such as for example, configuration parameters, gaming engines, third-party software, etc. There may not be a need to reboot the electronic device after updating these types of components.

Figure 2:
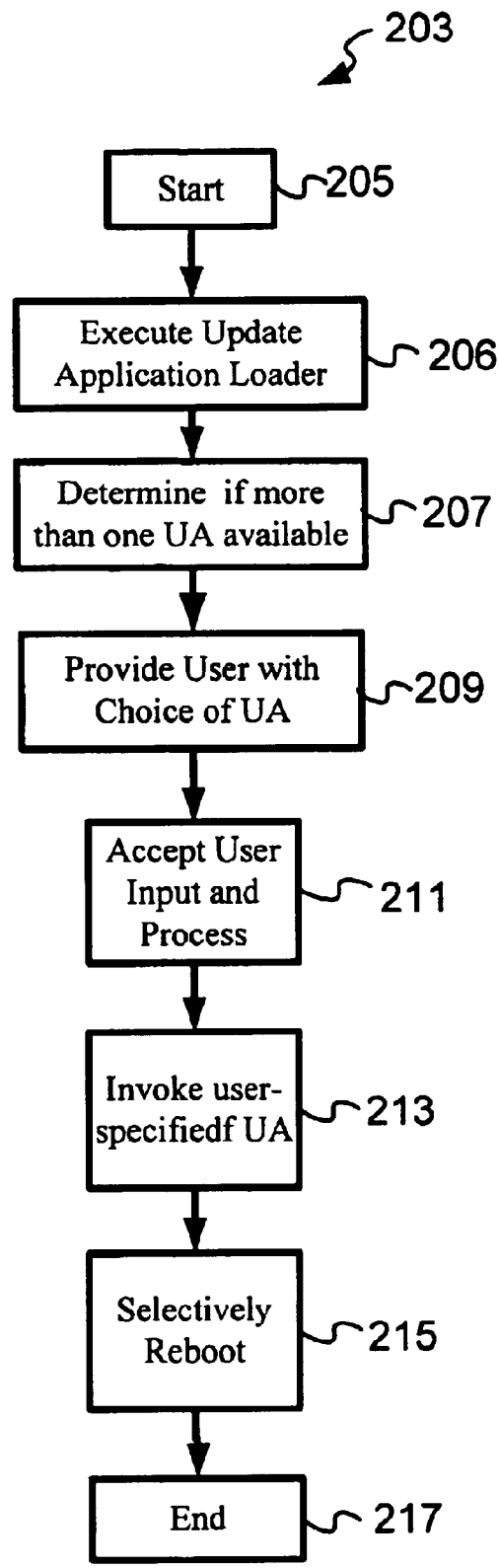
FIG. 2 is a flow chart illustrating an exemplary operation of the electronic device according to an embodiment of the present invention.

FIG. 2 is a flow chart 203 illustrating an exemplary method of operating an electronic device, such as, for example, the mobile handset 107 of FIG. 1, according to an embodiment of the present invention. The following description of FIG. 2 makes reference to elements illustrated in FIG. 1. FIG. 2 illustrates an embodiment wherein an end-user may be provided an opportunity, or be prompted, to select at least one of a plurality of available update agents to apply update information by employing at least one available update. Processing is initiated 205 when the electronic device reboots, starts-up, or is powered-up, the update application loader 127 is executed 206 and invokes the boot initialization code. The update application loader 127 may also determine update necessity of updates.

The update application loader 127 may then determine if more than one update agent is available (block 207) and assemble a displayable list of update agent names. The displayable list of update agent names may be displayed and the end-user may be prompted to select at least one of the available update agents to perform an update (block 209). The end-user's selection may be processed to determine and accept the update agent selected by the end-user (block 211).

The selected update agent, such as for example, update agent A 113 of FIG. 1, may be invoked (block 213). The update agent selected may access one or more updates and update at least one of firmware, software, configuration parameters, other components 121, etc., in the electronic device. The electronic device may be rebooted. For example, if the firmware 117 or operating system 119 has been updated, a reboot may be determined to be necessary. In an embodiment according to the present invention, if the other components 121 are updated, such as configuration parameters, third-party software, etc., then reboot of the electronic device may be determined to be unnecessary. Update related processing ends (block 217) and normal operation of the electronic device resumes or commences.

Figure 3:
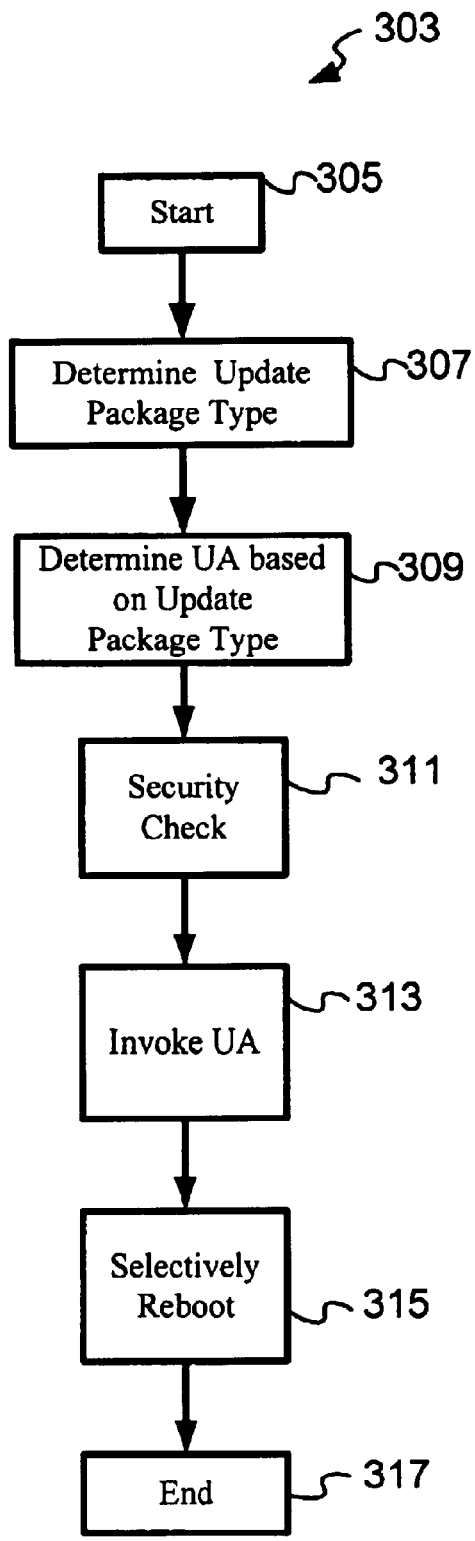
FIG. 3 is a flow chart illustrating an exemplary operation of the electronic device according to an embodiment of the present invention.

FIG. 3 is a flow chart 303 illustrating another exemplary method of operating an electronic device according to an embodiment of the present invention. The following description of FIG. 3 makes reference to elements illustrated in FIG. 1. The electronic device, for example mobile handset 107, may select at least one of a plurality of available update agents to apply one or more available updates. Processing is initiated (block 305) when the electronic device is rebooted or powered up, update application loader 127 is executed, and boot initialization code determines that an update is necessary.

The update application loader 127 may determine if more than one update agent is available and may also determine the type of the update to be performed (block 307). The update application loader 127 may determine which of the plurality of available update agents are adapted to process and apply the particular update type (block 309). In an embodiment according to the present invention, the name of the update or portions of the name of the update may be employed to determine which of the plurality of available update agents may be employed to process the update.

In an embodiment according to the present invention, a table of update agents may be maintained, wherein the table may map update types to corresponding update agents. The table may also be used to determine an appropriate one of the multiple update agents adapted to process the update.

A security check may be conducted to determine whether the update agent selected is permitted to update sections of non-volatile memory associated with a particular corresponding update (block 311). The selected update agent may be invoked, select one or more updates, and apply the corresponding updates (block 313). The electronic device may be rebooted (block 315). If firmware 117 or operating system software 119 has been updated, a reboot may be determined to be necessary. In an embodiment according to the present invention, however, if other components 121 are updated, such as for example, configuration parameters, a third-party software, etc. then reboot of the electronic device may be determined to be unnecessary. Update related processing ends (block 317) and normal operation of the electronic device resumes or commences.

Figure 4A:
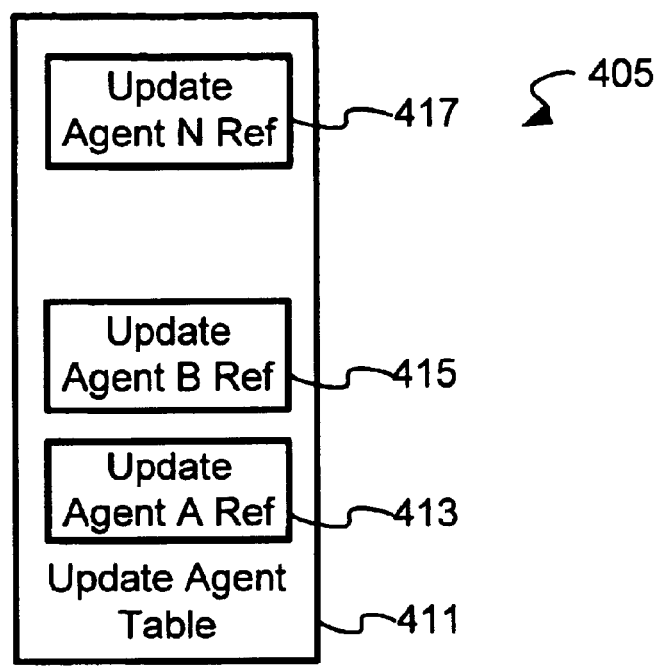
FIG. 4A is a block diagram illustrating an exemplary update agent table located in non-volatile memory of an electronic device according to an embodiment of the present invention.

FIG. 4A is a block diagram 405 illustrating an exemplary update agent table 411 located in non-volatile memory of an electronic device according to an embodiment of the present invention. The following description of FIG. 4A makes reference to elements illustrated in FIG. 1. The update agent table 411 may contain references to a plurality of update agents currently available in the electronic device, for example mobile handset 107. The update agent table 411 may also comprise references to the location of a plurality of update agents, such as for example, update agent A reference 413 and update agent B reference 415, for update agents such as, update agent A 113 and update agent B 115 of FIG. 1, located in non-volatile memory 111, respectively. When the electronic device determines which update agent should be invoked, the electronic device may obtain a reference to the selected update agent by employing update agent table 411, and subsequently invoking the selected update agent. When a new update agent is incorporated into the electronic device, a new entry may be added to the update agent table 411. The update agent table 411 may also be managed in terms of adding new entries and deleting old entries, etc., for example.

Figure 4B:
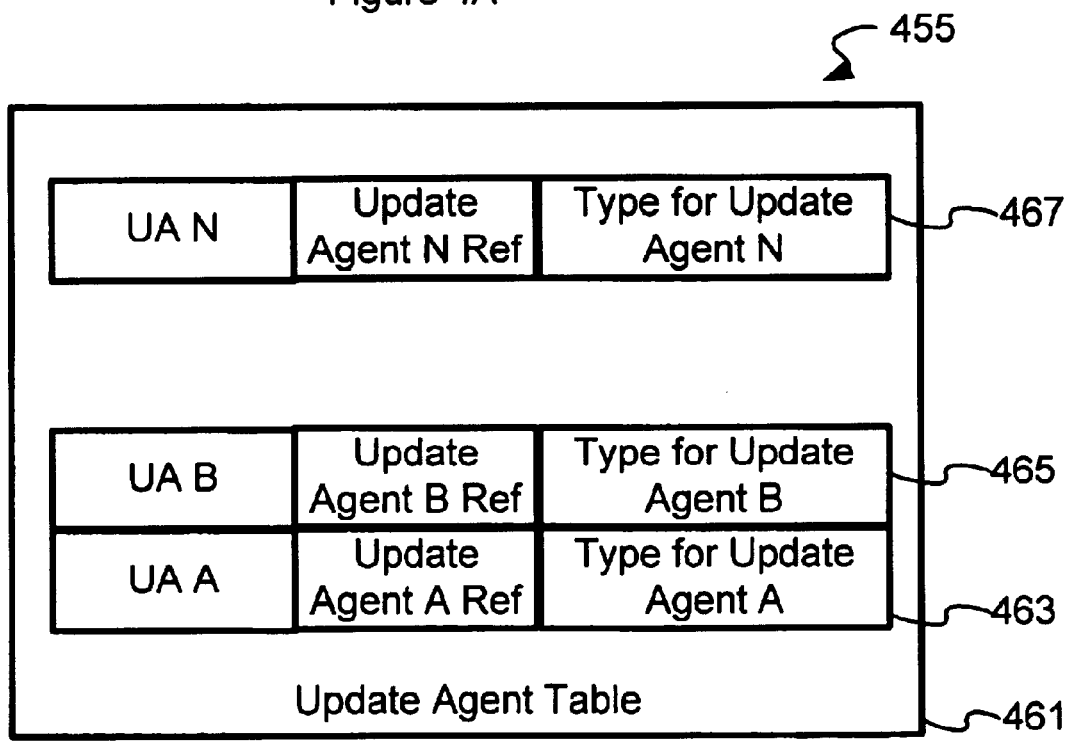
FIG. 4B is a block diagram illustrating an exemplary update agent table located in a non-volatile memory of an electronic device according to an embodiment of the present invention.

FIG. 4B is a block diagram 455 illustrating another exemplary update agent table 461 located in non-volatile memory of an electronic device according to an embodiment of the present invention. The following description of FIG. 4B makes reference to elements illustrated in FIG. 1. The update agent table 461 may contain references to a plurality of update agents currently available in the electronic device, for example, mobile handset 107. The update agent table 461 may also maintain mapping between update agent names, the update agent corresponding address location (i.e., where the update agent is located in non-volatile memory), and the type of update(s) that the update agent is adapted to process, for all of the available update agents in the electronic device. For example, an entry 463 in update agent table 461 may provide mapping between the update agent name 'UAA', the address location 'Update Agent A ref', and the type of update(s) the update agent is adapted to process. The type information may be provided as 'file extensions' in an embodiment according to the present invention. For example, the file extension 'dup' may correspond to updates generated by an update application generator. An update application generator may be adapted to determine appropriate update(s) for an electronic device. The type field in each entry in the update agent table 461 may also be a list of file extensions that the update agent is adapted to process in an embodiment according to the present invention.

Other structures and schemas are also contemplated for update agent table 461. An update agent table 461 may map the name of an update agent to the location where the update agent resides in memory, and also to the type of update(s) the update agent is adapted to process, as described above. An electronic device supporting multiple update agents may prompt and facilitate an end-user in selecting at least one update agent for processing a particular update(s). The electronic device may also subsequently apply an update to at least one of firmware, software, or device configuration, etc. in the electronic device The electronic device may also prompt and facilitate an end-user in selecting an appropriate update agent from a plurality of available update agents based upon update information, such as for example, the type of update(s) that the update agent may be adapted to perform.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and the appended diagrams. It is intended that the scope of the invention be limited not with this detailed description, but rather by the claims appended hereto.

What is claimed is:

1. A method of updating at least one of firmware and software in an electronic device comprising a plurality of update agents, the method comprising:
   executing an update application loader;
   invoking a boot initialization code;
   determining a list of available update agents and corresponding updates; and
   determining whether the electronic device needs to be updated by evaluating the list of available update agents and corresponding updates;
   displaying a list of available update agents to an end-user, the update agents associated with at least one update;
   prompting the end-user to select an update agent;
   invoking the selected update agent based upon information corresponding to a particular update; and
   performing the particular update.

2. The method according to claim 1, further comprising rebooting the electronic device after update completion.

3. The method according to claim 1, further comprising one of resuming and commencing characteristic electronic device operation after update completion.

4. The method according to claim 1, further comprising detecting a need to update at least one of firmware, software, device components, and device configuration during one of power-up and reboot.

5. The method according to claim 1, further comprising displaying a list of available updates, the plurality of update agents each being adapted to process particular updates, wherein prompting an end-user to select a particular update agent may correspond to prompting an end-user to apply a particular update.

6. The method according to claim 1, further comprising determining an update agent to invoke from among a plurality of available update agents based upon at least one of an update type, a name of an update, and a sub-component of a name of an update, to update at least one of firmware, software, device components, and device configuration of the electronic device.

7. The method according to claim 1, further comprising:
   maintaining a table of update agents in the electronic device, wherein the table of update agents maps update types to corresponding update agents;
   employing the table of update agents to determine an update agent adapted to process a particular update; and
   employing the determined update agent to process the particular update.

8. The method according to claim 1, further comprising conducting a security check to determine whether a selected update agent is permitted to update sections of non-volatile memory associated with a particular update.

9. The method according to claim 1, further comprising:
   selecting at least one update agent adapted to process a plurality of available updates; and
   applying the available updates using the selected at least one update agent.

10. The method according to claim 1, further comprising maintaining an update agent table, the update agent table comprising at least one of names of a plurality of update agents available in the electronic device, references to the plurality of update agents, and references to locations of the plurality of update agents.

11. The method according to claim 1, further comprising:
   determining an update agent to perform an update;
   obtaining a reference to the update agent by evaluating an update agent table; and
   performing at least one update associated with the update agent.

12. The method according to claim 1, further comprising maintaining a table of update agents, the table of update agents comprising entries providing information corresponding to update agents and associated updates available in the electronic device.

13. The method according to claim 1, further comprising maintaining an update agent table comprising references to a plurality of update agents in the electronic device, the update agent table mapping at least one of update agent names, update agent address locations, type information corresponding to updates that particular update agents are adapted to process, and availability of particular update agents.

14. The method according to claim 13, wherein type information further comprises at least one of a file extension corresponding to a particular update that an update agent is adapted to process and a list of file extensions corresponding to a plurality of updates that an update agent is adapted to process.

15. The method according to claim 1, wherein the electronic device comprises one of a mobile cellular phone handset, a personal digital assistant, a pager, an MP3 player, and a digital camera.

16. An electronic device comprising:
   a plurality of update agents in non-volatile memory, each of the update agents being adapted to update at least one of firmware, software, device configuration, and device components;

random access memory; and an update application loader, wherein the electronic device is adapted to execute the update application loader during one of power-up and reboot, invoke a boot initialization code, determine a list of available update agents and corresponding updates, and determine whether the electronic device needs to be updated by evaluating the list of available update agents and corresponding updates.

17. The device according to claim 16, wherein the electronic device is adapted to display a list of available update agents from the plurality of update agents in non-volatile memory in the electronic device to an end-user, prompt the end-user to select an update agent, invoke the selected update agent based upon information corresponding to a particular update, and performing the particular update.

18. The device according to claim 17, wherein the electronic device is adapted to reboot after update completion.

19. The device according to claim 17, wherein the electronic device is adapted to one of resume and commence characteristic electronic device operation after update completion.

20. The device according to claim 16, wherein the electronic device is adapted to detect a need to update at least one of firmware, software, device configuration, and device components during one of power-up and reboot.

21. The device according to claim 16, wherein the electronic device is adapted to display a list of available updates, each of the plurality of update agents being adapted to process a particular update, wherein an end-user may be prompted to select a particular update agent, and wherein selecting a particular update agent corresponds to selecting a particular update.

22. The device according to claim 16, wherein the electronic device is adapted to determine an update agent to invoke from among a plurality of available update agents based upon at least one of an update type, a name of an update, and a sub-component of a name of an update, to update at least one of firmware, software, device components, and device configuration of the electronic device.

23. The device according to claim 16, wherein the electronic device is adapted to maintain a table of update agents in the electronic device, wherein the table of update agents maps update types to corresponding update agents, the electronic device also being adapted to employ the table of update agents to determine an update agent adapted to process a particular update, and to employ the determined update agent to process the particular update.

24. The device according to claim 16, wherein the electronic device is adapted to conduct a security check to determine whether a selected update agent is permitted to update sections of a non-volatile memory associated with a particular update.

25. The device according to claim 16, wherein the electronic device is adapted to determine an update agent adapted to process a plurality of available updates and apply the available updates.

26. The device according to claim 16, wherein the electronic device is adapted to maintain an update agent table, the update agent table comprising at least one of names of a plurality of update agents available in the electronic device, references to the plurality of update agents, and references to locations of the plurality of update agents.

27. The device according to claim 16, wherein the electronic device is adapted to determine an update agent to perform an update, obtain a reference to the update agent by evaluating an update agent table, invoke the update agent, and perform at least one update associated with the update agent.

28. The device according to claim 16, wherein the electronic device is adapted to maintain a table of update agents, the table of update agents comprising entries providing information corresponding to update agents and associated updates available in the electronic device.

29. The device according to claim 16, wherein the electronic device is adapted to maintain an update agent table comprising references to a plurality of update agents in the electronic device, the update agent table mapping at least one of update agent names, update agent address locations, type information corresponding to updates that particular update agents are adapted to process, and availability of particular update agents.

30. The device according to claim 29, wherein type information further comprises at least one of a file extension corresponding to a particular update that an update agent is adapted to process and a list of file extensions corresponding to a plurality of updates that an update agent is adapted to process.

31. The device according to claim 16, wherein the electronic device comprises one of a mobile cellular phone handset, a personal digital assistant, a pager, an MP3 player, and a digital camera.

32. A mobile electronic device comprising:

an update application loader; and a boot initialization code, wherein the update application loader is adapted to be executed at one of startup and reboot, the update application loader is adapted to invoke the boot initialization code, determine whether the mobile electronic device needs to be updated, locate an update agent, and invoke the located update agent to update at least one of firmware and software in the mobile electronic device.

33. The mobile electronic device according to claim 32, wherein the located update agent that is an application, and the update application loader invokes the located update agent after determining that at least one of firmware and software needs to be updated.

34. The mobile electronic device according to claim 33, wherein the update application loader is adapted to invoke a located update agent and be updated by the located update agent.

35. The mobile electronic device according to claim 33, wherein performing an update comprises installing a second update agent, and the mobile electronic device is adapted to invoke a first update agent to perform the update installing the second update agent in the mobile electronic device.

36. The mobile electronic device according to claim 33, wherein the update application loader is adapted to be updated to a new version by invoking an update agent to update the update application loader.

37. A mobile electronic device comprising:

a boot initialization code; and an update application loader, wherein the mobile electronic device, during at least one of reboot and power up, is adapted to execute the boot initialization code, and wherein the update application loader is adapted to determine whether the mobile electronic device needs to be updated, and the update application loader is adapted to employ at least one of a plurality of update agents, each of the update agents comprising at least one associated update, wherein the update application loader is adapted to determine an update agent to perform the at least one associated update and select the update agent from among the plurality of available update agents.

38. The mobile electronic device according to claim 37, wherein the update application loader is adapted to select at least one of the plurality of available update agents based upon at least one of a type of update that the update agent is adapted to perform and a particular characteristic associated with a particular update.

39. A method of updating at least one of firmware and software in an electronic device comprising a plurality of update agents, the method comprising:
   maintaining an update agent table comprising references to a plurality of update agents in the electronic device, the update agent table mapping at least one of:
      update agent names;
      update agent address locations;
      type information corresponding to updates that particular update agents are adapted to process, wherein type information further comprises at least one of:
         a file extension corresponding to a particular update that an update agent is adapted to process; and
         a list of file extensions corresponding to a plurality of updates that an update agent is adapted to process; and
      availability of particular update agents; and
   displaying a list of available update agents to an end-user, the update agents associated with at least one update;
   prompting the end-user to select an update agent;
   invoking the selected update agent based upon information corresponding to a particular update; and
   performing the particular update.

40. The method according to claim 39, further comprising rebooting the electronic device after update completion.

41. The method according to claim 39, further comprising one of resuming and commencing characteristic electronic device operation after update completion.

42. The method according to claim 39, further comprising detecting a need to update at least one of firmware, software, device components, and device configuration during one of power-up and reboot.

43. The method according to claim 39, further comprising displaying a list of available updates, the plurality of update agents each being adapted to process particular updates, wherein prompting an end-user to select a particular update agent may correspond to prompting an end-user to apply a particular update.

44. The method according to claim 39, further comprising:
   executing an update application loader;
   invoking a boot initialization code;
   determining a list of available update agents and corresponding updates; and
   determining whether the electronic device needs to be updated by evaluating the list of available update agents and corresponding updates.

45. The method according to claim 44, further comprising determining an update agent to invoke from among a plurality of available update agents based upon at least one of an update type, a name of an update, and a sub-component of a name of an update, to update at least one of firmware, software, device components, and device configuration of the electronic device.

46. The method according to claim 39, further comprising:
   maintaining a table of update agents in the electronic device, wherein the table of update agents maps update types to corresponding update agents;
   employing the table of update agents to determine an update agent adapted to process a particular update; and
   employing the determined update agent to process the particular update.

47. The method according to claim 39, further comprising conducting a security check to determine whether a selected update agent is permitted to update sections of non-volatile memory associated with a particular update.

48. The method according to claim 39, further comprising:
   selecting at least one update agent adapted to process a plurality of available updates; and
   applying the available updates using the selected at least one update agent.

49. The method according to claim 39, further comprising maintaining an update agent table, the update agent table comprising at least one of names of a plurality of update agents available in the electronic device, references to the plurality of update agents, and references to locations of the plurality of update agents.

50. The method according to claim 39, further comprising:
   determining an update agent to perform an update;
   obtaining a reference to the update agent by evaluating an update agent table; and
   performing at least one update associated with the update agent.

51. The method according to claim 39, further comprising maintaining a table of update agents, the table of update agents comprising entries providing information corresponding to update agents and associated updates available in the electronic device.

52. The method according to claim 39, wherein the electronic device comprises one of a mobile cellular phone handset, a personal digital assistant, a pager, an MP3 player, and a digital camera.

53. An electronic device comprising:
   a plurality of update agents in non-volatile memory, each of the update agents being adapted to update at least one of firmware, software, device configuration, and device components;
   random access memory; and
   an update application loader, wherein the electronic device is adapted to maintain an update agent table comprising references to a plurality of update agents in the electronic device, the update agent table mapping at least one of:
      update agent names;
      update agent address locations;
      type information corresponding to updates that particular update agents are adapted to process, wherein type information further comprises at least one of:
         a file extension corresponding to a particular update that an update agent is adapted to process; and
         a list of file extensions corresponding to a plurality of updates that an update agent is adapted to process; and
      availability of particular update agents.

54. The device according to claim 53, wherein the electronic device is adapted to display a list of available update agents from the plurality of update agents in non-volatile memory in the electronic device to an end-user, prompt the end-user to select an update agent, invoke the selected update agent based upon information corresponding to a particular update, and performing the particular update.

55. The device according to claim 54, wherein the electronic device is adapted to reboot after update completion.

56. The device according to claim 54, wherein the electronic device is adapted to one of resume and commence characteristic electronic device operation after update completion.

57. The device according claim 53, wherein the electronic device is adapted to detect a need to update at least one of firmware, software, device configuration, and device components during one of power-up and reboot.

58. The device according to claim 53, wherein the electronic device is adapted to display a list of available updates, each of the plurality of update agents being adapted to process a particular update, wherein an end-user may be prompted to select a particular update agent, and wherein selecting a particular update agent corresponds to selecting a particular update.

59. The device according to claim 53, wherein the electronic device is adapted to execute an update application loader during one of power-up and reboot, invoke a boot initialization code, determine a list of available update agents and corresponding updates, and determine whether the electronic device needs to be updated by evaluating the list of available update agents and corresponding updates.

60. The device according to claim 53, wherein the electronic device is adapted to determine an update agent to invoke from among a plurality of available update agents based upon at least one of an update type, a name of an update, and a sub-component of a name of an update, to update at least one of firmware, software, device components, and device configuration of the electronic device.

61. The device according to claim 53, wherein the electronic device is adapted to maintain a table of update agents in the electronic device, wherein the table of update agents maps update types to corresponding update agents, the electronic device also being adapted to employ the table of update agents to determine an update agent adapted to process a particular update, and to employ the determined update agent to process the particular update.

62. The device according to claim 53, wherein the electronic device is adapted to conduct a security check to determine whether a selected update agent is permitted to update sections of non-volatile memory associated with a particular update.

63. The device according to claim 53, wherein the electronic device is adapted to determine an update agent adapted to process a plurality of available updates and apply the available updates.

64. The device according to claim 53, wherein the electronic device is adapted to maintain an update agent table, the update agent table comprising at least one of names of a plurality of update agents available in the electronic device, references to the plurality of update agents, and references to locations of the plurality of update agents.

65. The device according to claim 53, wherein the electronic device is adapted to determine an update agent to perform an update, obtain a reference to the update agent by evaluating an update agent table, invoke the update agent, and perform at least one update associated with the update agent.

66. The device according to claim 53, wherein the electronic device is adapted to maintain a table of update agents, the table of update agents comprising entries providing information corresponding to update agents and associated updates available in the electronic device.

67. The device according to claim 53, wherein the electronic device comprises one of a mobile cellular phone handset, a personal digital assistant, a pager, an MP3 player, and a digital camera.

* * * * *